US006708217B1

(12) United States Patent
Colson et al.

(10) Patent No.: US 6,708,217 B1
(45) Date of Patent: Mar. 16, 2004

(54) METHOD AND SYSTEM FOR RECEIVING AND DEMULTIPLEXING MULTI-MODAL DOCUMENT CONTENT

(75) Inventors: James C. Colson, Austin, TX (US); Sandeep K. Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,276

(22) Filed: Jan. 5, 2000

(51) Int. Cl.[7] ............................................. G06F 13/00
(52) U.S. Cl. ..................... 709/231; 709/217; 709/219; 709/203; 709/226
(58) Field of Search ............................... 709/203–206, 709/217–219, 226

(56) References Cited

U.S. PATENT DOCUMENTS

| | | | | |
|---|---|---|---|---|
| 5,754,774 A | | 5/1998 | Bittinger | 395/200.33 |
| 5,812,784 A | | 9/1998 | Watson | 395/200.57 |
| 5,818,446 A | | 10/1998 | Bertram | 345/334 |
| 5,848,415 A | | 12/1998 | Guck | 707/10 |
| 5,864,870 A | * | 1/1999 | Guck | 707/104.1 |
| 5,867,661 A | | 2/1999 | Bittinger | 395/200.57 |
| 5,867,799 A | | 2/1999 | Lang | 707/1 |
| 5,870,546 A | | 2/1999 | Kirsch | 395/200.33 |
| 5,870,562 A | | 2/1999 | Butman | 395/200.68 |
| 5,884,035 A | | 3/1999 | Butman | 395/200.48 |
| 5,892,909 A | | 4/1999 | Grasso | 395/200.31 |
| 5,913,038 A | * | 6/1999 | Griffiths | 709/231 |
| 6,029,200 A | * | 2/2000 | Beckerman et al. | 709/226 |
| 6,182,094 B1 | * | 1/2001 | Humpleman et al. | 715/513 |
| 6,199,136 B1 | * | 3/2001 | Shteyn | 710/129 |
| 6,324,182 B1 | * | 11/2001 | Burns et al. | 370/429 |
| 6,349,132 B1 | * | 2/2002 | Wesemann et al. | 379/88.17 |
| 6,446,130 B1 | * | 9/2002 | Grapes | 709/231 |
| 6,523,696 B1 | * | 2/2003 | Saito et al. | 709/236 |
| 6,557,042 B1 | * | 4/2003 | He et al. | 709/231 |
| 2002/0038374 A1 | * | 3/2002 | Gupta et al. | 709/231 |

* cited by examiner

Primary Examiner—Wen-Tai Lin
(74) Attorney, Agent, or Firm—A. Bruce Clay; Marcia L. Doubet

(57) ABSTRACT

A method, system, and computer-readable code for receiving and demultiplexing multi-modal document content. A demultiplexing component receives HTTP (HyperText Transfer Protocol) or WSP (Wireless Service Protocol) response messages containing multipart documents from a document server. Each content type of the multipart document is located by this component and used to locate an appropriate content renderer. A content registry, which stores mappings between content types and renderers capable of processing that content type, may be consulted to locate an appropriate renderer. Or, a dynamic query message may be issued on a network to detect any available renderers. The document content corresponding to the content type is then distributed to the located renderer, which renders it to the user.

33 Claims, 7 Drawing Sheets

FIG. 3

| 300 | content type 301 | content renderer 302 |
|---|---|---|
| 310 | text/ascii 311 | facsimile 201 312 |
| 320 | text/html 321 | handheld device 204 322 |
| 330 | image/gif 331 | dashboard device 202 332 |
| 340 | audio/wav 341 | audio processor 203 342 |

METHOD AND SYSTEM FOR RECEIVING AND DEMULTIPLEXING MULTI-MODAL DOCUMENT CONTENT

BACKGROUND OF THE INVENTION

1. Field of the Invention

The present invention relates to a computer system, and deals more particularly with a method, system, and computer-readable code for receiving and demultiplexing multi-modal document content.

2. Description of the Related Art

"Multi-modal document content" or "Multi-modal Web content" refers to a Web page which contains multiple media types, also referred to herein as multiple modes or multiple content types. A "Web page," as is well known in the art, is a file or document created for use in the World Wide Web environment (hereinafter, "Web"). Web pages are typically located using a "URL," or Uniform Resource Locator, which is a form of address adapted to use in the distributed network environment of the Web. Web pages are typically encoded in the HyperText Markup Language, or "HTML." As an example of a Web page being "multi-modal," it is common for a single Web page to include text as well as graphics, images, sound files, and perhaps video. While images may be embedded directly within a textual Web page document (e.g. using the "<img>", or image, tag in HTML), content having other media types is typically linked to the textual document in a manner that requires the user to select a link reference (such as a hypertext link from the displayed textual Web page) before the linked content will be rendered to the user. An anchor, or "<a>" tag, is used in HTML to provide this type of external link.

A user requesting a Web page uses a Web browser (which is a software application adapted to processing Web documents, such as an HTML browser which processes HTML documents) to generate a request for a Web page using its URL and to send the request to a Web server. The Web server then locates the requested content and returns it to the requesting browser. Upon receiving the requested document, the browser renders it for presentation to the user. The document text, when encoded in HTML format, is processed by an HTML parser and then displayed. (Text may be delivered in other formats, such as the Extensible Markup Language (XML), in which case a corresponding parser must process the encoded document before displaying it.)

The computing device on which the Web browser is executing typically has one or more "helper applications" installed, where these helper applications may comprise: an image processing application; an audio processing application; a video processing application; a text-to-speech generator (e.g. for use with documents encoded in the VoiceXML markup language); etc. The Web browser, upon detecting a content type which the browser is not prepared to render directly, automatically invokes the appropriate helper application to handle the received content. As an alternative to helper applications, applets or plug-ins may be used for processing multimedia files. Applets are small pieces of executable code that are typically downloaded to a user's computer from a server through a network dynamically, as the code is needed for execution. Applets are often referenced from a Web document and may be used to process some part of that document. Plug-ins are small, special-purpose software applications adapted to particular processing needs. A plug-in may be used, for example, to process a file (such as a sound file) which a particular Web browser is not capable of processing. These techniques are well known in the art, and the software with which they are implemented is readily available on the market.

A Web server communicating with a Web browser using the HyperText Transfer Protocol ("HTTP") typically returns a requested document to the browser as a two-part transmission. (Note that while the discussions herein refer to the HTTP protocol, this is for purposes of illustration and not of limitation. The Wireless Session Protocol, commonly referred to as "WSP," may be used alternatively, as may other semantically equivalent protocols.) The first part is a header describing the returned document, and the second part is the document itself. Within the HTTP header of the first part is a "Content-type" entry, describing the content type of the document using the Multi-Part Internet Mail Extensions ("MIME") notation. For example, if the document comprises text encoded in HTML, the content type will use the special syntax "text/html" (as defined by the MIME standard). When the response includes multiple documents or document parts having multiple content types, then the HTTP header preferably uses the content type "multipart/mixed" to indicate that a multipart message with data in more than one is being sent. Or, if the multiple parts are to be viewed simultaneously, the content type "multipart/parallel" is preferably used. (Alternatively, the content types of "multipart/alternative" or "multipart/digest" may be used where appropriate. Refer to RFC (Request for Comments) 1521, "MIME (Multipurpose Internet Mail Extensions) Part One: Mechanisms for Specifying and Describing the Format of Internet Message Bodies" and RFC 1522, "MIME (Multipurpose Internet Mail Extensions) Part Two: Message Header Extensions for Non-ASCII Text", for more information on MIME types.) This content type is interpreted by the receiving Web browser as it determines how to process and render the received Web document. When the "multipart/mixed" content type is used in an HTTP header, it is followed by a keyword "boundary=" and some text string. This text string is also located within the returned document as a delimiter between the different document parts, and enables separation of the different content types in the document. For example, if the boundary string is defined as "—abc123XYZ987" then this string may be used to delimit parts of a document containing a JPEG image and ASCII text as shown below:

—abc123XYZ987

Content-type: image/jpeg

< . . . the image content . . . >

—abc123XYZ987

Content-type: text/ascii

< . . . some ASCII text . . . >

—abc123XYZ987—

Computing devices are becoming smaller and more specialized as computing becomes more pervasive in today's world. Because of their increased portability, these smaller devices enable the user to perform computing functions regardless of where he happens to be at the time, and some allow a user to easily transport the device as the user moves about in his daily activities. Examples of this type of computing device include: Web-enabled cellular phones; wearable computing devices; devices mounted in a vehicle, such as an on-board navigation system; computing devices adapted to use in the home, such as an intelligent sensor built into a kitchen appliance; mobile computers; handheld computers such as the WorkPad from the International Business Machines Corporation ("IBM"); etc. ("WorkPad" is a registered trademark of IBM.) As computing devices become smaller and more specialized, however, the functions available on a particular device are fewer in number and typically more scaled-down in function. A Web-enabled cellular phone, for example, may be able to display only a small amount of text on its limited-size display screen while having no capability for processing image or video files. A wearable computing device, on the other hand, may be able to process sound files but not display text.

Many existing Web pages have been created with the expectation that they would be delivered to a full-function Web browser executing on a personal computer, with helper applications, applets, and/or plug-ins readily available for processing any content types included as part of the Web document. This is not necessarily the case as the smaller and more specialized computing devices are also capable of requesting and receiving Web documents. In the vehicle environment, for example, multiple devices may be available with each capable of processing a different combination of text, image, and sound; however, these disparate devices are unlikely to be integrated into a single unit. Instead, the devices are likely to be physically separate special-purpose devices. Consequently, a Web browser cannot simply route the received content to the appropriate renderers for the received content type(s) because those renderers are not coupled together. This is also true in the home networking environment where the home network may include: display-only devices spread strategically throughout the house, where these display devices may be unable to render streamed video data; modules in appliances that send and receive data such as status information (including equipment failure indicators) to other devices (such as personal computers) located in the home, where these modules are unlikely to have audio, image, video, or sometimes even text display capability. Finally, as previously discussed, a wearable computing device may be very limited in the types of content it can render.

These environments of specialized computing devices, each having different user interface capabilities, will become more commonplace in the near future. However, today's Web model makes it impossible for a single document to simultaneously drive multiple user interfaces spread among these different devices. Accordingly, what is needed is a technique with which these devices can cooperate to render a multi-modal Web document.

SUMMARY OF THE INVENTION

An object of the present invention is to provide a technique whereby multi-modal document content can be received, demultiplexed, and distributed to one or more appropriate content renderers.

Yet another object of the present invention is to hide the physical identity of the content renderers from the server from which the document is retrieved. Another object of the present invention is to provide this technique in a manner whereby content renderers pre-register the content type(s) that they are capable of processing.

Another object of the present invention is to provide this technique in a manner whereby content rendering capabilities are dynamically determined by issuing a network query message.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for receiving and demultiplexing multi-modal document content. This technique comprises: providing a demultiplexing (demux) component; providing a plurality of content renderers coupled to the demux component via a network; generating a document request from a first client; sending the document request over an external network to a document server; receiving, at the demux component, a response document returned by the document server in response to the sent document request; locating at least one content type in the received response document; locating a selected one of the content renderers which is capable of rendering the at least one content type; and distributing a document content associated with the at least one content type to the located selected one content renderer.

The technique may further comprise repeatedly executing the location of the at least one content type, the location of the selected one content renderer,-and the distributing.

Or, the technique may further comprise receiving the distributed document content at the selected content renderer and rendering the received document content.

The generated document request may be generated as a HyperText Transport Protocol (HTTP) message, or it may be generated as a Wireless Session Protocol (WSP) message.

Locating the selected one of the content renderers may further comprise using the at least one content type to access a stored registry of content type to content renderer mappings. In addition, the technique may further comprise creating at least one entry in the stored registry of content type to content renderer mappings. This creation may comprise: sending, from the one or more devices on which the plurality of content renderers are executing, one or more content registration messages to the demux controller, each of the messages indicating a particular content type which the device is capable of rendering and an identifier of the device; receiving the registration messages at the demux controller; and using the particular content type and the device identifier from each of the received registration messages to create or update a corresponding entry in the registry. The registration messages may conform to a Universal Plug and Play protocol, or they may conform to a Jini protocol.

Alternatively, locating the selected one of the content renderers may further comprise: issuing a network query from the demux component, the network query specifying the content type; receiving the issued network query by one or more devices on which the content renderers are located; making a determination, by each of the one or more devices, whether to respond to the received query, wherein the determination by each particular one of the devices is based on one or more capabilities of the particular device and the content renderers located thereupon; sending a response to the received query from selected ones of the devices when the determination has a positive result; and receiving the responses at the demux component.

The technique may further comprise initiating a HyperText Transfer Protocol (HTTP) request from at least one of the one or more devices, the at least one device including a selected device on which the selected one of the content renderers is executing, and receiving the HTTP request at the demux component, thereby establishing an outstanding request from each of the at least one devices. In this case, distributing the document content may further comprise distributing the document content to the selected one on an open connection associated with a selected one of the outstanding requests, the selected one of the outstanding requests being that one initiated by the selected device.

Alternatively, the technique may further comprise initiating a Wireless Session Protocol (WSP) request from at least one of the one or more devices on which the plurality of content renderers are executing, the at least one device including a selected device on which the selected one of the content renderers is executing, and receiving the WSP request at the demux component, thereby establishing an outstanding request from each of the at least one devices. In this case, distributing the document content may further comprise distributing the document content to the selected one content renderer on an open connection associated with a selected one of the outstanding requests, the selected one of the outstanding requests being that one initiated by the selected device.

Distributing the document content may further comprise issuing a HyperText Transfer Protocol (HTTP) POST message to the selected one content renderer.

The present invention will now be described with reference to the following drawings, in which like reference numbers denote the same element throughout.

BRIEF DESCRIPTION OF THE DRAWINGS

FIG. 3 depicts a representative content registry that may be used with the preferred embodiment of the present invention.

DESCRIPTION OF THE PREFERRED EMBODIMENT

Figure 1:
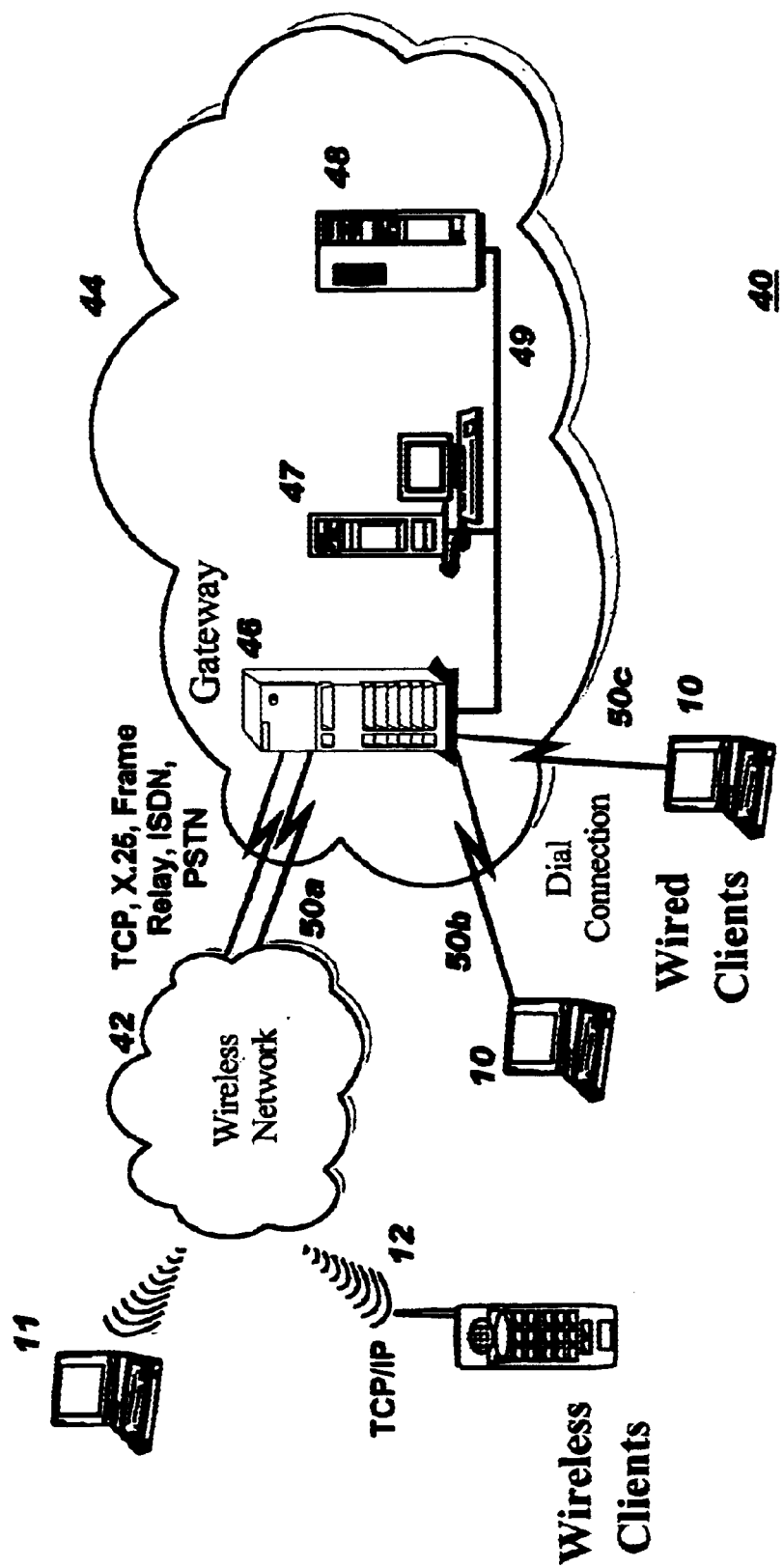
FIG. 1 is a block diagram of a networked computing environment in which the present invention may be practiced.

FIG. 1 illustrates a representative network computing environment in which the present invention may be practiced.

The data processing network 40 may include a plurality of individual networks, such as wireless network 42 and network 44, each of which may include a plurality of individual workstations 10, 11, 12. Additionally, as those skilled in the art will appreciate, one or more LANs may be included (not shown), where a LAN may comprise a plurality of intelligent workstations coupled to a host processor.

Workstations 10 are shown as wired clients and may be any type of device having processing and communication capabilities. A workstation 10 may communicate with other computers or networks of computers, for example via a communications channel or modem. Workstation 11 is similarly any type of computing device, connected to a wireless network. Specifically, cellular phone devices 12 are shown as connecting to wireless network 42 using wireless means. One example of the means in which the wireless link is made is using a wireless interface to the cellular phone 12, such as a CDPD (cellular digital packet data) card. The workstation 10, 11, 12 may be associated with other computers in a local area network (LAN) or a wide area network (WAN), or the workstation 10, 11, 12 can be a client in a client/server arrangement with another computer, etc. All of these configurations, as well as the appropriate communications hardware and software, are known in the art.

Still referring to FIG. 1, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10, 11, 12 may be located a substantial distance from the networks 42 and 44. For example, the network 42 may be located in California, while the gateway 46 may be located in Texas, and one or more of the workstations 10, 11, 12 may be located in New York. The workstations 11, 12 may connect to the wireless network 42 using a networking protocol such as TCP/IP. A number of alternative connection media may be used, such as cellular phone networks, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 1.

A user of the present invention may connect his computing device to a server using a wireless connection or a wireline connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computing device may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computing device will be referred to equivalently as a "workstation," "device," or "computer," and use of any of these terms or the term "server" refers to any of the types of computing devices described above.

The present invention discloses a technique for requesting a Web document by a Web client, and demultiplexing and distributing a received multi-modal document among a plurality of Web clients, each having different content rendering capabilities.

This technique uses a component referred to herein as a "Web Demultiplexer," or "Wdemux," which is located between the Web clients and the external network. This component is preferably implemented as one or more code modules (or objects, in object-oriented programming) which are added to an existing proxy or router host. Alternatively, this component may be implemented as a stand-alone component responsible only for demultiplexing and distributing document content.

Figure 2:
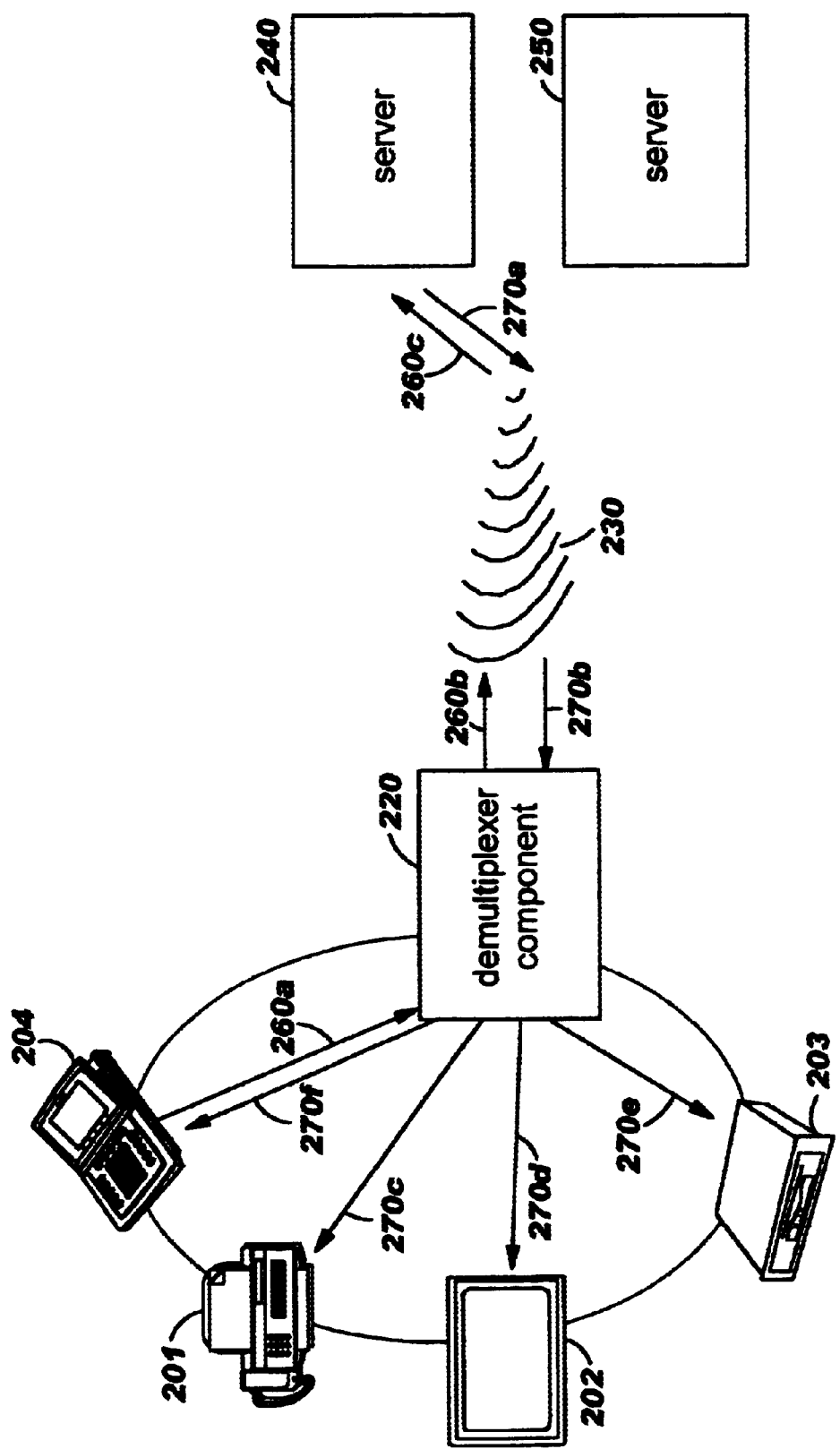
FIG. 2 shows a representative flow of messages among devices when the present invention is being used.

Referring to FIG. 2, a Wdemux 220 is shown situated between the plurality of Web clients 201 (a facsimile machine), 202 (a vehicle dashboard display device), 203 (an audio processor), 204 (a handheld mobile computer) and the network 230 (which in this example is a wireless network). A plurality of Web servers 240, 250 is shown at the remote side of network 230. Preferably, all client HTTP requests will pass through the Wdemux on the outbound path to the server. (Alternatively, the present invention may be implemented in a manner whereby the outgoing HTTP requests are sent directly to a Web server, with all incoming responses being routed through the Wdemux.)

The manner in which the present invention receives and demultiplexes (and then distributes) multi-modal document content will be now described with reference to an example. An outgoing HTTP request message is shown in FIG. 2 as being generated by the handheld mobile computer 204 and transmitted 260a to the Wdemux 220. The Wdemux 220 then forwards 260b this message to the network 230, which then forwards 260c the same message to a Web server 240. Alternatively, the Wdemux 220 may augment the forwarded request with additional information, such as the content types accepted by the plurality of content renderers coupled to the Wdemux. Web server 240 retrieves the requested document, which for purposes of this example is assumed to be a multi-modal document, and returns 270a the document through the network 230 back 270b to the Wdemux 220. Wdemux 220, upon determining that the returned document is multi-modal, then consults a content registry (see element 300 of FIG. 3). Suppose that the returned document includes a first text file having content type "text/ascii", a second text file having content type "text/html", an image having content type "image/gif", and a sound file having content type "audio/wav". (As previously described, the presence of these multiple content types is preferably indicated by a "Content-type: multipart/mixed" or "Content-type: multipart/parallel" entry in the HTTP response header, with the individual content types following this first content type entry and preceding the respective content information.) After locating entry 310 in content registry 300, where this entry specifies 312 the registered content handler (referred to equivalently herein as a "content renderer") for "text/ascii" documents 311, the Wdemux 220 then routes 270c this ASCII text to the fax machine 201 where it will be printed using the fax machine's existing circuitry. (The content handler registration entries 302 in registry 300 may use a host name syntax and/or an address syntax, and may identify a software component such as a browser or a hardware component such as a particular device, without deviating from the inventive concepts defined herein. A textual device representation has been shown in FIG. 3 for ease of illustration.) Entry 320 specifies that the handler 322 for content type "text/html" 321 is the handheld computing device 204, and thus the Wdemux 220 routes 270f the HTML text to this device for rendering using the device 204's HTML processor. Entry 330 indicates, at element 332, that "image/gif" 331 files are to be rendered by the dashboard display device 202. The Wdemux 220 will therefore route 270d the image to device 202, where it will be displayed to the user using device 202's existing image rendering functions. Finally, entry 340 of registry 300 indicates (see element 342) that "audio/wav" 341 content is to be rendered by the audio processor 203, and the Wdemux 220 will therefore route 270e the sound file to processor 203 where it will be played for the user.

As will be obvious, the content of registry 300 as depicted in FIG. 3 is for purposes of illustration and not of limitation. More or fewer entries (such as 310, 320, . . . ) may exist in a particular registry, and although a single content handler 302 has been shown for each content type 301 in the example of FIG. 3, it may happen that zero or perhaps multiple content handlers will be registered for a particular type. When multiple handlers are registered, the Wdemux may select among them using implementation-specific criteria. One way in which this selection may be implemented is by adding a status indicator (not shown) for each content handler, where this indicator has values such as "offline" and "available". (Note that this assumes that a mechanism exists for setting the indicator as appropriate, such as when a particular device is powered on. This will be discussed in more detail with reference to FIG. 5, below.) When multiple handlers are registered for a particular content type, the Wdemux then preferably selects one of them which has its status indicator set to "available." Alternative selection criteria may exist, including the performance, cost, or fidelity of the device. This information would be conveyed to the Wdemux in an implementation-dependent way, possibly by using the Composite Capability Preferences Profile (CCPP) standard being developed by the World-Wide Web Consortium (W3C) or User Agent Profiles (UAProf) standard being developed by the Wireless Application Protocol (WAP) Forum.

The preferred embodiment of the logic with which the present invention may be implemented will now be discussed in more detail with reference to FIGS. 4 and 5.

Figure 4A:
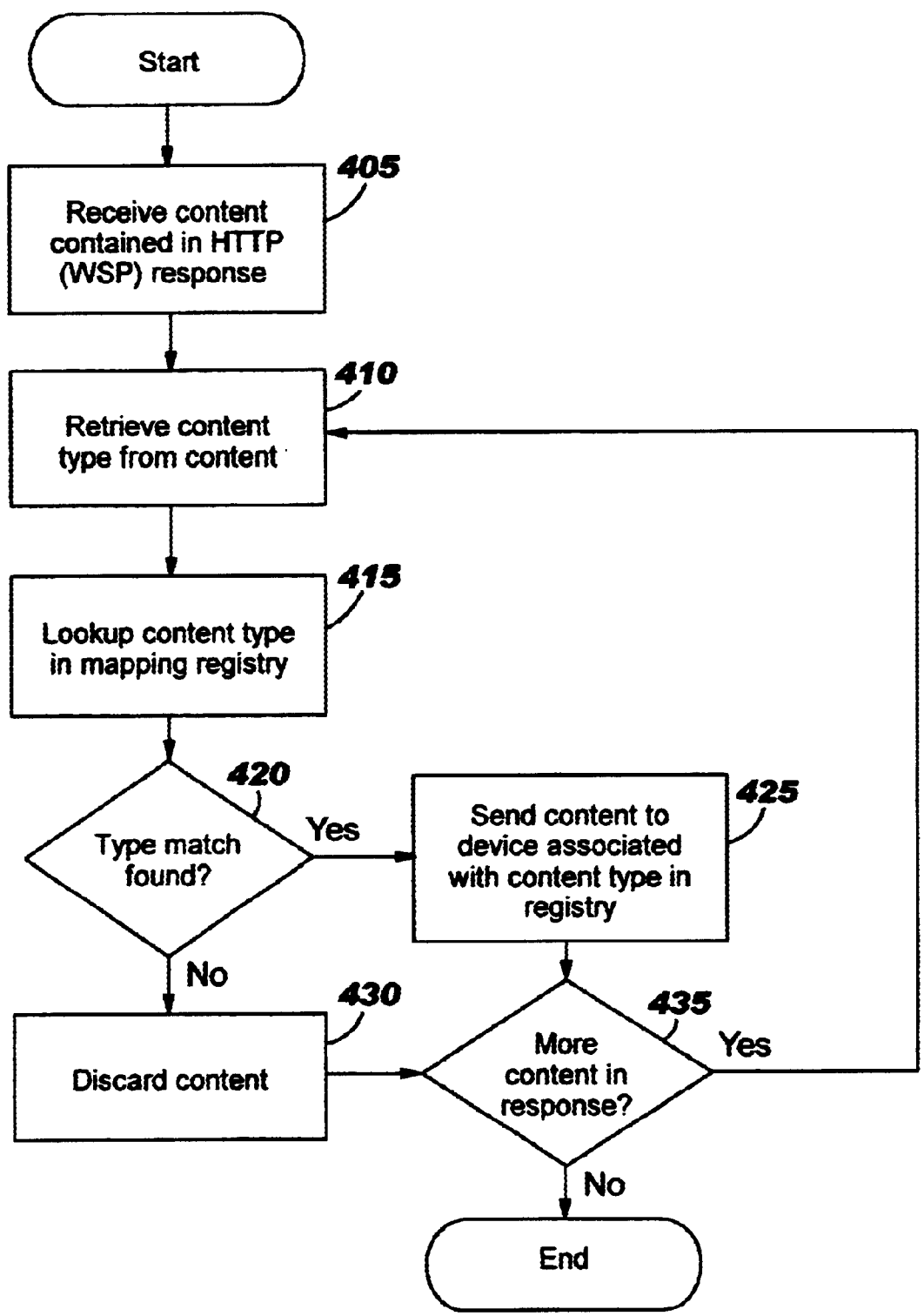
FIGS. 4A–4D and 5 illustrate the logic with which a preferred embodiment of the present invention may be implemented.

FIG. 4A depicts the logic used in the Wdemux 220 for receiving documents from network 230, locating the appropriate content handlers, and distributing the content to those handlers. The process begins at Block 405, where an incoming document is received in an HTTP or WSP response. At Block 410, the Wdemux (after determining that the received document is a multipart document by the presence of a multipart tag in the content type of the response header) then retrieves the first of the multiple content types. As previously described, existing syntax requirements state that a "boundary=" tag and associated boundary string follow the multipart tag in the response header. Retrieving each of the multiple content types comprises searching the returned document for this boundary string. This boundary string entry will be followed by a "Content-type:" entry which includes the MIME content type of the subsequent content. Block 410 locates the value of the content type (e.g. "text/ascii"). (If the document is not multipart, then the first Content-type entry in the response header will identify the single content type of the returned document. Upon detecting this situation at Block 410, the single content type will be processed using the logic shown in FIG. 4A, with Block 435 having a negative response on the first iteration.)

At Block 415, the Wdemux consults the content registry using the content type retrieved by Block 410. As described with reference to the example of FIGS. 2 and 3, this registry preferably contains entries for multiple content types, along with an identifier representing the content renderer(s) capable of rendering that content type. The registry may be statically preprogrammed by an automated process or a person such as a systems designer, or its values may be dynamically generated as clients register themselves with the Wdemux (as will be described with reference to FIG. 5).

Block 420 checks to see whether Block 415 found a type match. If so, control transfers to Block 425. Otherwise, Block 430 preferably discards the content following the boundary string and content type syntax that was located by Block 410, after which processing continues at Block 435.

Block 425 is reached when a type match was found in the registry. Block 425 indicates that the corresponding document content is sent to the device associated with the matching content type in the content registry. (This has been described above with reference to the example in FIGS. 2 and 3.) Control then transfers to Block 435.

Block 435 checks to see whether there are more content types, and thus more content to be processed, in the response document. The end of the multipart document is indicated, according to current syntax requirements, by the presence of the boundary string followed by two dashes. When the end of the multipart document is reached (i.e. when Block 435 has a negative response), the final document part has already been processed and thus the processing of FIG. 4A ends. When there are more document parts to process (i.e. Block 435 has a positive response), control returns to Block 410.

Figure 4B:
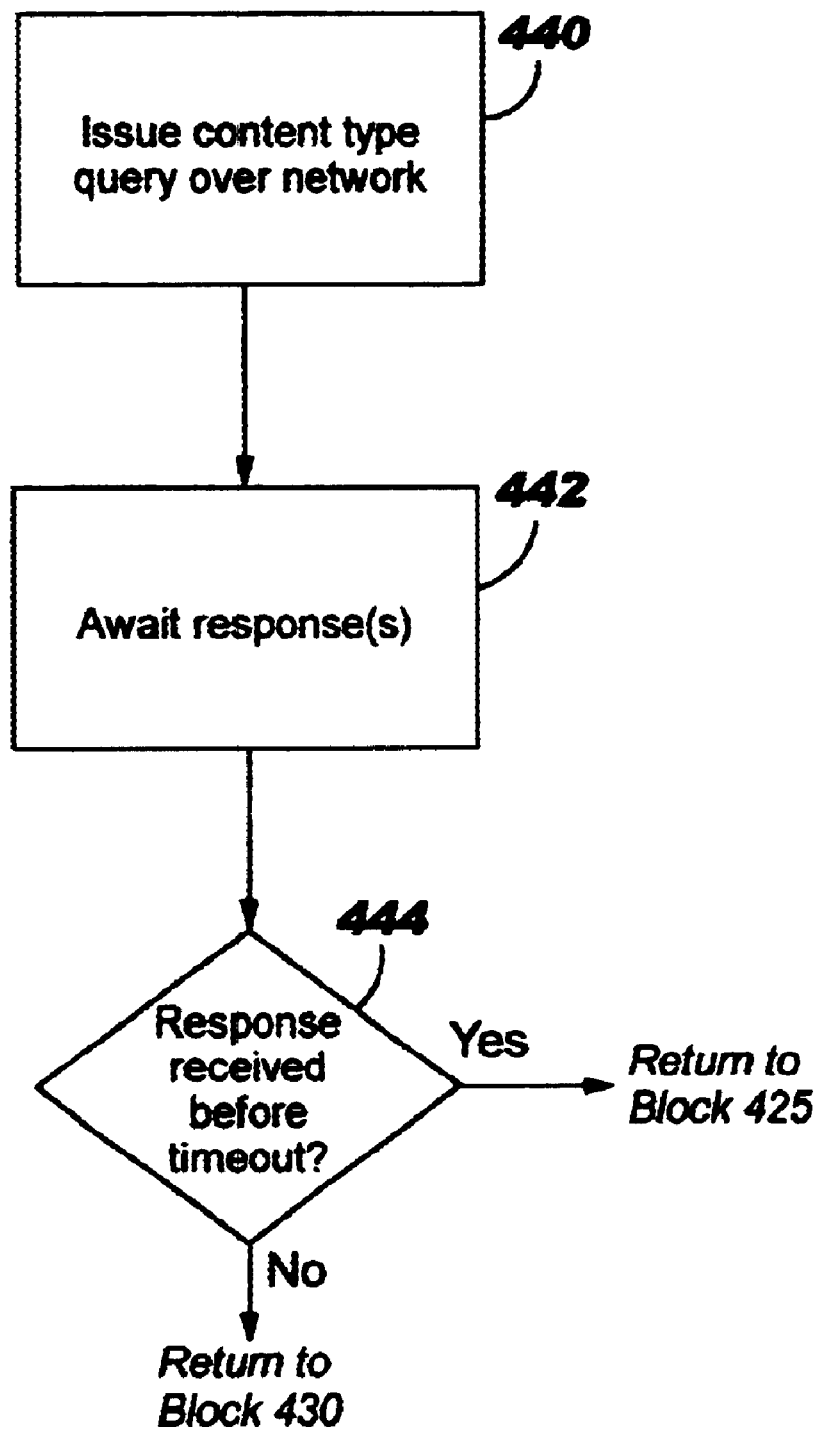

FIG. 4B depicts alternative processing that may used for Blocks 415 and 420 of FIG. 4A. Rather than search for a particular content type in a registry accessible to the Wdemux component, a content type query may be issued over the network at Block 440. The content type query designates the type of content that needs to be rendered. Upon receiving the content query, each client device decides whether to respond according to whether that client device hosts a renderer that is capable of rendering the content type being requested. In Block 442, the Wdemux awaits responses to the query of Block 440 from the devices currently located on the network. Upon receiving one or more responses (a positive response in Block 444), processing returns to Block 425 where the content is distributed to the appropriate renderer that has indicated the ability to render that content. If, after some timeout period, no response is received (a negative response in Block 444), then the Wdemux assumes that no device hosts a renderer that is capable of rendering the content type, and processing returns to Block 430. The actual packet format for the request issued in Block 440 and the response received in Block 442 may differ according to the implementation. The Service Location Protocol (SLP) from the IETF and Salutation protocol from the Salutation Consortium provide suitable formats for querying devices on a network for a particular capability.

Whether a content registry is used (as described with respect to Block 415 of FIG. 4A) or queries are issued to the network (as described with reference to Block 440 of FIG. 4B) is an implementation-specific decision. The former constumes less network bandwidth and provides quicker turnaround time between receiving a response document and distributing it to a renderer. The latter is more resilient to dynamic networks (i.e. networks where devices attach and detach at will). Or, a combination of these techniques may be used. For example, a content registry may first be consulted, as described with reference to Block 415, and if a matching entry is not found then a dynamic query may be issued as described with reference to Block 440 as a second attempt at locating an appropriate content renderer.

Figure 4C:
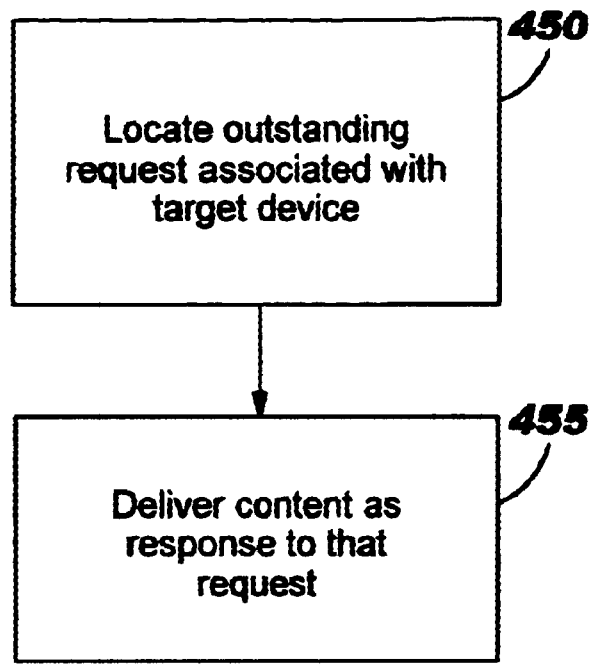

FIG. 4C depicts additional detail for the preferred embodiment of the processing performed by Block 425 of FIG. 4A In this preferred embodiment, an outstanding HTTP (or semantically equivalent protocol) request is maintained between each client device (201, 202, . . . ) and the Wdemux 220. At Block 450, the Wdemux locates the outstanding request for the content renderer located by Block 415 of FIG. 4A or Block 442 of FIG. 4B. The content is then delivered to that renderer using the open connection associated with the outstanding request in Block 455. (In this embodiment, the client then preferably issues another HTTP request to the Wdemux after rendering the delivered content, as will be described with reference to FIG. 5.)

Figure 4D:

As an alternative to maintaining outstanding HTTP requests between the clients and the Wdemux, the Wdemux may use the HTTP POST method to deliver content to a rendering client using an HTTP request message. This alternative is shown in FIG. 4D at Block 460. Other alternative methods of "pushing" content from the Wdemux to the rendering client exist, including WAP PUSH, e-mail over Simple Mail Transfer Protocol (SMTP), Short-Message Service (SMS), or even circuit-switched telephony. These alternative techniques may be applied without reducing the inventive concepts disclosed herein.

The techniques of FIG. 4C and 4D may be used separately or they may be used in conjunction. In the latter case, the processing of FIG. 4C is used if an outstanding request exists to a particular target renderer and the processing of FIG. 4D is used otherwise. Both the techniques of FIG. 4C and of FIG. 4D may either send the entire content that is to be rendered, or they may using a caching technique. In the preferred embodiment, this caching technique comprises: (1) caching the document content for each part of a multipart document into a cache accessible to the Wdemux; (2) creating a local URL with which each cached entry can be accessed; (3) sending this local URL to the appropriate renderer (at Block 455 or 460); and (4) delivering the cached content to the renderer upon receiving a subsequent request for the local URL.

Figure 5:
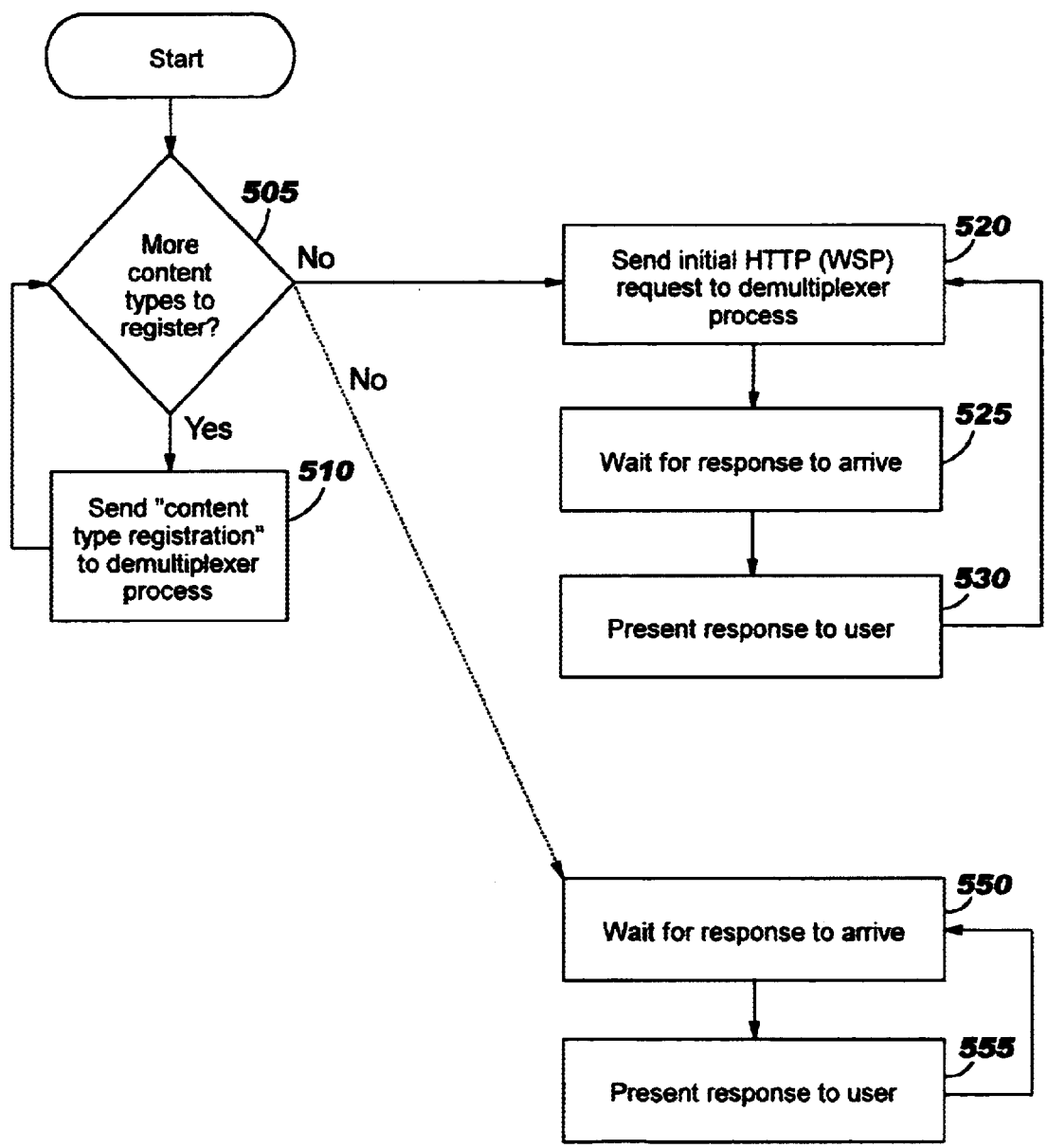

FIG. 5 depicts the logic with which the preferred embodiment of the present invention operates in the content renderers. As has been described, a content registry used with the present invention may be statically created by a person, or it may be created dynamically as devices attach to and detach from the network to which the Wdemux is attached. It will be obvious to one of ordinary skill in the art how a systems administrator statically creates such a registry (e.g. using a simple text editor or customized graphical tool). The technique with which the registry may be dynamically created is shown as Blocks 505 and 510 of FIG. 5. (This processing may also be used in conjunction with a statically created registry, to augment the entries contained therein so that they reflect the most current network environment.) At Block 505, a device attaching itself to the local network checks to see whether it hosts any content renderers capable of handling particular content types delivered from the Wdemux. If not, then this processing is complete and control transfers to Block 520. Otherwise, a registration message (comprising the information stored in the registry, as described with reference to the example registry of FIG. 3) is sent to the Wdemux process by Block 510. Control then returns to Block 505, enabling the registration process to be repeated for as many content types as the device has clients capable of rendering. The actual protocol used to deliver this registration message and manage the registration may differ according to the implementation. For example, the emerging Universal Plug and Play (UPnP) standard and the Jini software from Sun Microsystems, Inc. define techniques for dynamically connecting devices to networks. In these systems, each device must have a locally-stored definition of its capabilities, which it can deliver to a server. These capabilities must be periodically refreshed at the server so that the system can time-out stale registrations and thereby stay robust in the face of dynamic network configurations.

Blocks 520 through 530 depict the preferred embodiment of the logic with which a content renderer receives and renders content according to the present invention. As previously stated with reference to FIG. 4C, each content renderer preferably has an outstanding HTTP request to the Wdemux. Block 520 sends the initial HTTP request to the Wdemux to create this outstanding request. This request includes the identity of the requesting device, so that the Wdemux can select the appropriate connection on which to deliver content destined for a particular renderer. The content renderer process then waits, as shown in Block 525, for a response to this request to be returned. When a response arrives, Block 530 renders the received document content for presentation (such as a visual display of text or images, playing of sound files, etc.) to the user. Control then returns to Block 520, where a new HTTP request is issued to create a new outstanding request to the Wdemux. This process repeats until terminated (e.g. by the device detaching from the local network).

Blocks 550 and 555 may be used as an alternative to the processing of Blocks 520 through 530. This alternative corresponds to the situation where the Wdemux uses Block 460 of FIG. 4D to POST document content to rendering devices. Not having an outstanding HTTP request, the renderer waits (Block 550) for a POST to arrive in an HTTP request message, and then presents (Block 555) the included content to the user. These processing of these two blocks iterates until terminated, as described above.

As has been demonstrated, the present invention provides a technique for effectively demultiplexing multi-modal document content and distributing that content to multiple clients (i.e. content renderers), each capable of handling a different media type.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product for receiving and demultiplexing multi-modal document content, said computer program product embodied on a computer-readable medium readable by a computing device in a computing environment and comprising:

computer-readable program code means for generating a document request from a first client;

computer-readable program code means for sending said document request over an external network to a document server;

computer-readable program code means for receiving, at a demultiplexing (demux) component that is physically distinct from said first client and said document server a response document returned by said document server in response to said sent document request;

computer-readable program code means for locating, by said demux component, one or more content types in said received response document;

computer-readable program code means for accessing, by said demux component, a stored registry of content type-to-content renderer mappings, using each of said located content types, thereby identifying a content renderer which is capable of rendering said located content type, wherein said stored registry identifies a plurality of content renderers that are each operable on one or more of a plurality of devices coupled to said demux component via a network; and computer-readable program code means for distributing by said demux component, for each of said located content types, document content associated therewith to a particular one of said devices on which said identified content renderer is operable, wherein at least one of said particular devices is distinct from that one of said plurality of devices upon which said first client is operating.

2. The computer program product according to claim 1, further comprising:

computer-readable program code means for receiving said distributed document content at at least one of said particular devices to which said document content is distributed; and computer-readable program code means for rendering, at each receiving device, said received document content using said identified content renderer that is operable on said receiving device.

3. The computer program product according to claim 1, wherein said generated document request is generated as a HyperText Transport Protocol (HTTP) message.

4. The computer program product according to claim 1, wherein said generated document request is generated as a Wireless Session Protocol (WSP) message.

5. A computer program product for receiving and demultiplexing multi-modal document content, said computer program product embodied on a computer-readable medium readable by a computing device in a computing environment and comprising:

computer-readable program code means for generating a document request from a first client;

computer-readable program code means for sending said document request over an external network to a document server;

computer-readable program code means for receiving, at a demultiplexing (demux) component that is physically distinct from said first client and said document, server a response document returned by said document server in response to said sent document request;

computer-readable program code mean for locating, by said demux component, one or more content types in said received response document;

computer-readable program code means for issuing from said demux component, for each of said located content types, a network query that specifies said located content type;

computer-readable program code means, operable on one or more devices, for:

receiving at least one of said issued network queries; and making a determination of whether to respond to each received query, wherein said determination is based on whether a content renderer that is capable of rendering said content type specified in said received query is operable on said receiving device, and sending a response thereto if so, said response identifying said receiving device;

computer-readable program code means for receiving said responses at said demux component; and computer-readable program means for distributing by said demux component, for each of said located content types, document content associated therewith to said device which is identified in a selected one of said received responses to said network query that specified said located content type.

6. The computer program product according to claim 1, further comprising:

computer-readable program code means for initiating a HyperText Transfer Protocol (HTTP) request from at least one of said plurality of devices to said demux component; and computer-readable program code means for receiving each of said HTTP requests at said demux component, thereby establishing an outstanding request from each of said at least one initiating devices; and wherein, for at least one of said located content types, said particular one of said devices to which document content is distributed is one of said initiating devices, and wherein said computer-readable program code means for distributing said document content further comprises computer-readable program code means for distributing said document content to said initiating device using an open connection associated with said outstanding request from said initiating device.

7. The computer program product according to claim 1, further comprising:

computer-readable program code means for initiating a Wireless Session Protocol (WSP) request from at least one of said plurality of devices to said demux component; and computer-readable program code means for receiving each of said WSP requests at said demux component, thereby establishing an outstanding request from each of said at least one initiating devices; and wherein, for at least one of said located content types, said particular one of said devices to which document content is distributed is one of said initiating devices, and wherein said computer-readable program code means for distributing said document content further comprises computer-readable program code means for distributing said document content to said initiating device using an open connection associated with said outstanding request from said initiating device.

8. The computer program product according to claim 1, wherein said computer-readable program code means for distributing said document content further comprises computer-readable program code means for issuing, for each of said located content types, a HyperText Transfer Protocol (HTTP) POST message to said particular one of said devices, wherein said HTTP POST message carries said document content being distributed.

9. The computer program product according to claim 1, further comprising computer-readable program code means for dynamically updating said stored registry, responsive to receiving content registration messages sent from said devices on which said content renderers are operable, each of said messages indicating a particular content type which said device is capable of rendering and an identifier of said device, and wherein said computer-readable program code means for dynamically updating, uses said particular content type and said device identifier from each of said received registration messages to create or update a corresponding entry in said registry.

10. The computer program product according to claim 9, wherein said registration messages conform to a Universal Plug and Play protocol.

11. The computer program product according to claim 9, wherein said registration messages conform to a Jini protocol.

12. A system for receiving and demultiplexing multi-modal document content in a computing environment, comprising:

a first client;

a demultiplexing (demux) component that is physically distinct from said first client and a document server;

a plurality of content renderers that are each operable on one or more of a plurality of devices coupled to said demux component via a network;

means for generating a document request from said first client;

means for sending said document request over an external network to said document server;

means for receiving, at said demux component, a response document returned by said document server in response to said sent document request;

means for locating, by said demux component one or more content types in said received response document;

means for accessing, by said demux component, a stored registry of content type-to-content renderer mappings, using each of said located content types, thereby identifying a content renderer which is capable of rendering said located content type, wherein entries in said stored registry identify selected ones of said plurality of content renderers; and means for distributing by said demux component for each of said located content types, document content associated therewith to a particular one of said devices on which said identified content renderer is operable, wherein at least one of said particular devices is distinct from that one of said plurality of devices upon which said first client is operating.

13. The system according to claim 12, further comprising:

means for receiving said distributed document content at at least one of said particular devices to which said document content is distributed; and means for rendering said received document content, at each receiving device, using said identified content renderer that is operable on said receiving device.

14. The system according to claim 12, wherein said generated document request is generated as a HyperText Transport Protocol (HTTP) message.

15. The system according to claim 12, wherein said generated document request is generated as a Wireless Session Protocol (WSP) message.

16. A system for receiving and demultiplexing multi-modal document content in a computing environment comprising:

a first client;

a demultiplexing (demux) component that is physically distinct from said first client and a document server;

a plurality of content renderers that are each operable on one or more of a plurality of devices coupled to said demux component via a network;

means for generating a document request from said first client;

mean for sending said document request over an external network to said document server;

means for receiving, at said demux component a response document returned by said document server in response to said sent document request;

means for locating, by said demux component, one or more content types in said received response document;

means for issuing from said demux component, for each of said located content types, a network query that specifies said located content type;

means, operable on one or more devices on which said content renderers are operable, for:
receiving at least one of said issued network queries; and
making a determination of whether to respond to each received query, wherein said determination is based on whether one of said content renderers that is capable of rendering said content type specified in said received query is operable on said receiving device, and sending a response thereto if so, said response identifying said receiving device;

means for receiving said responses at said demux component; and means for distributing by sad demux component, for each of said located content types, document content associated therewith to said device which is identified in a selected one of said received responses to said network query that specified said located content type.

17. The system according to claim 12, further comprising:
means for initiating a HyperText Transfer Protocol (HTTP) request from at least one of said plurality of devices to said demux component; and
means for receiving each of said HTTP requests at said demux component, thereby establishing an outstanding request from each of said at least one initiating devices; and
wherein, for at least one of said located content types, said particular one of said devices to which said document content is distributed is one of said initiating devices, and wherein said means for distributing said document content further comprises means for distributing said document content to said initiating device using an open connection associated with said outstanding request from said initiating device.

18. The system according to claim 12, further comprising:
means for initiating a Wireless Session Protocol (WSP) request from at least one of said plurality of devices to said demux component; and
means for receiving each of said WSP requests at said demux component, thereby establishing an outstanding request from each of said at least one initiating devices; and
wherein, for at least one of said located content types, said particular one of said devices to which said document content is distributed is one of said initiating devices, and wherein said means for distributing said document content further comprises means for distributing said document content to said initiating device using an open connection associated with said outstanding request from said initiating device.

19. The system according to claim 12, wherein said means for distributing said document content further comprises means for issuing, for each of said located content types, a HyperText Transfer Protocol (HTTP) POST message to said particular one of said devices, wherein said HTTP POST message carries said document content being distributed.

20. The system according to claim 12, further comprising means for dynamically updating said stored registry, responsive to receiving content registration messages sent from said devices on which said content renderers are operable, each of said messages indicating a particular content type which said device is capable of rendering and an identifier of said device, and wherein said means for dynamically updatin, uses said particular content type and said device identifier from each of said received registration messages to create or update a corresponding one of said entries in said registry.

21. The system according to claim 20, wherein said registration messages conform to a Universal Plug and Play protocol.

22. The system according to claim 20, wherein said registration messages conform to a Jini protocol.

23. A method for receiving and demultiplexing multi-modal document content in a computing environment, comprising the steps of:
providing a demultiplexing (demux) component;
providing a plurality of content renderers that are each operable on one or more of a plurality of devices coupled to said demux component via a network;
generating a document request from a first client, wherein said first client is physically distinct from said demux component;
sending said document request over an external network to a document server wherein said document server is physically distinct from said demux component;
receiving, at said demux component, a response document returned by said document server in response to said sent document request;
locating, by said demux component one or more content types in said received response document;
accessing by said demux component, a stored registry of content type-to-content renderer mappings, using each of said located content types, thereby identifying a content renderer which is capable of rendering said located content type, wherein entries in said stored registry identify selected ones of said plurality of content renderers; and
distributing by said demux component, for each of said located content types, document content associated therewith to a particular one of said devices on which said identified content renderer is operable, wherein at least one of said particular devices is distinct from that one of said plurality of devices upon which said first client is operating.

24. The method according to claim 23, further comprising the steps of:
receiving said distributed document content at at least one of said particular devices to which said document content is distributed; and
rendering said received document content, at each receiving device, using said identified content renderer that is operable on said receiving device.

25. The method according to claim 23, wherein said generated document request is generated as a HyperText Transport Protocol (HTTP) message.

26. The method according to claim 23, wherein said generated document request is generated as a Wireless Session Protocol (WSP) message.

27. A method of receiving and demultiplexing multi-modal document content comprising the steps of:

provinding a demultiplexing (demux) component;

providing a plurality of content renderers that are each operable on one or more of a plurality of devices coupled to said demux component via a network;

generating a document request from a first client, wherein said first client is physically distinct from said demux component;

sending said document request over an external network to a document server wherein said document server is physically distinct from said demux component;

receiving, at said demux component, a response document returned by said document server in response to said sent document request;

locating by said demux component, one or more content types in said received response document;

issuing from said demux component, for each of said located content types, a network query that specifies said located content type;

performing, by at least one of said devices on which said content renderers are operable, the steps of:

receiving at least one of said issued network queries; and making a determination of whether to respond to each received query, wherein said determination is based on whether one of said content renderers that is capable of rendering said content type specified in said received query is operable on said receiving device, and sending a response thereto if so, said response identifying said receiving device;

receiving said responses at said demux component; and distributing by said demux component, for each of said located content types, document content associated therewith to said device which is identified in a selected one of said received responses to said network query that specified said located content type.

28. The method according to claim 23, further comprising the steps of:

initiating a HyperText Transfer Protocol (HTTP) request from at least one of said plurality of devices to said demux component; and receiving each of said HTTP requests at said demux component, thereby establishing an outstanding request from each of said at least one initiating devices; and wherein, for at least one of said located content types, said particular one of said devices to which said document content is distributed is one of said initiating devices, and wherein said step of distributing said document content further comprises the step of distributing said document content to said initiating device using an open connection associated with said outstanding request from said initiating device.

29. The method according to claim 23, further comprising the steps of:

initiating a Wireless Session Protocol (WSP) request from at least one of said plurality of devices to said demux component; and receiving each of said WSP requests at said demux component, thereby establishing an outstanding request from each of said at least one initiating devices; and wherein, for at least one of said located content types, said particular one of said devices to which said document content is distributed is one of said initiating devices, and wherein said step of distributing said document content further comprises the step of distributing said document content to said initiating device using an open connection associated with said outstanding request from said initiating device.

30. The method according to claim 23, wherein said step of distributing said document content firer comprises the step of issuing, for each of said located content types, a HyperText Transfer Protocol (HTTP) POST message to said particular one of said devices, wherein said HTTP POST message carries said document content being distributed.

31. The method according to claim 23, further comprising the step of:

dynamically updating said stored registry, responsive to receiving content registration messages sent from said devices on which said content renderers are operable, each of said messages indicating a particular content type which said device is capable of rendering and an identifier of said device, and wherein said dynamically updating step uses, said particular content type and said device identifier from each of said received registration messages to create or update a corresponding one of said entries in said registry.

32. The method according to claim 31, wherein said registration messages conform to a Universal Plug and Play protocol.

33. The method according to claim 31, wherein said registration messages conform to a Jini protocol.

* * * * *